United States Patent
Liang

(10) Patent No.: US 10,060,509 B2
(45) Date of Patent: Aug. 28, 2018

(54) PANCAKE GEAR MOTOR

(71) Applicants: SAFEWAY ELECTRO-MECHANICAL CO., LTD., New Taipei (TW); Chia-Sheng Liang, Taipei (TW)

(72) Inventor: Chia-Sheng Liang, Taipei (TW)

(73) Assignees: SAFEWAY ELECTRO-MECHANICAL CO., LTD., New Taipei (TW); Chia-Sheng Liang, Taipei (TW)

(*) Notice: Subject to any disclaimer, the term of this patent is extended or adjusted under 35 U.S.C. 154(b) by 218 days.

(21) Appl. No.: 15/285,691

(22) Filed: Oct. 5, 2016

(65) Prior Publication Data

US 2018/0073597 A1  Mar. 15, 2018

(30) Foreign Application Priority Data

Sep. 9, 2016 (TW) ............................. 105129220 A

(51) Int. Cl.

| | |
|---|---|
| *F16H 57/02* | (2012.01) |
| *F16H 1/28* | (2006.01) |
| *F16H 57/021* | (2012.01) |
| *H02K 1/14* | (2006.01) |
| *H02K 1/27* | (2006.01) |
| *H02K 3/18* | (2006.01) |
| *H02K 7/08* | (2006.01) |
| *H02K 7/116* | (2006.01) |
| *H02K 21/14* | (2006.01) |

(52) U.S. Cl.
CPC ............. *F16H 1/28* (2013.01); *F16H 57/021* (2013.01); *H02K 1/146* (2013.01); *H02K 1/2706* (2013.01); *H02K 3/18* (2013.01); *H02K 7/08* (2013.01); *H02K 7/116* (2013.01); *H02K 21/14* (2013.01)

(58) Field of Classification Search
CPC ........................... F16H 57/021; H02K 1/2706
See application file for complete search history.

(56) References Cited

U.S. PATENT DOCUMENTS

| | | | |
|---|---|---|---|
| 6,031,308 A | 2/2000 | Kinoshita et al. | |
| 6,196,347 B1 | 3/2001 | Chao et al. | |
| 6,296,072 B1* | 10/2001 | Turner | B62M 6/45 180/206.2 |
| 6,629,574 B2 | 10/2003 | Turner | |
| 7,886,858 B2* | 2/2011 | Ai | B60K 7/0007 180/65.51 |

(Continued)

*Primary Examiner* — Derek D Knight
(74) *Attorney, Agent, or Firm* — Chun-Ming Shih

(57) ABSTRACT

A gear motor for decreasing speed at a mechanical power output is provided with a housing; a supporting shaft disposed along an axis of the housing and fastened in the housing; a planetary gear train as a speed reducer which is rotatably supported by the supporting shaft; and an electric motor including an outer stator and an inner permanent magnet, the electric motor disposed around the planetary gear train and within the housing. The planetary gear train includes a stationary sun gear secured to the housing and coaxially disposed around the axis of the housing; a driving sun gear as a torque output; planet gear assemblies equally spaced around an outer surface of the stationary sun gear. Each planet gear assembly includes coaxial first and second gears; and a carrier pivotably supported by the supporting shaft and attached to the permanent magnet.

12 Claims, 5 Drawing Sheets

(56) References Cited

U.S. PATENT DOCUMENTS

| | | | | |
|---|---|---|---|---|
| 9,855,992 B1* | 1/2018 | Liang | ................... | B60K 7/0007 |
| 9,945,454 B2* | 4/2018 | Liang | ....................... | F16H 3/64 |
| 2007/0249457 A1* | 10/2007 | Tesar | ..................... | B64C 13/34 |
| | | | | 475/180 |
| 2017/0267314 A1* | 9/2017 | Liang | ...................... | B62M 6/55 |
| 2018/0003266 A1* | 1/2018 | Liang | ....................... | F16H 1/28 |

* cited by examiner

PANCAKE GEAR MOTOR

BACKGROUND OF THE INVENTION

1. Technical Field

The invention relates to gear motors and more particularly to a pancake gear motor.

2. Related Art

Conventionally, a gear motor is an electric motor having a reduction gear assembly or a non-gear type speed reduction mechanism. For achieving a low speed and high torque output, a motor is required to have an increased size and thus has an increased manufacturing cost. To the contrary, for achieving a high speed and low torque output, a motor is required to have a decreased size and thus has a decreased manufacturing cost. The reduction gear assembly can lower an input speed and increase output torque of a motor.

Gear motors can be found in patent literature such as U.S. Pat. Nos. 6,196,347, 6,296,072, and 6,629,574 which all are directed to electric bicycles having a reduction gear assembly for saving labor when pedaling. U.S. Pat. No. 6,031,308 discloses a small gear motor for use in a camera.

Conventionally, for a gear motor having a reduction gear assembly, a pinion is attached to an open end of a supporting shaft and meshes a gear or gear train. Alternatively, a worm is attached to an open end of a supporting shaft and meshes a worm gear. In any of above U.S. Pat. Nos. 6,196,347, 6,296,072, 6,629,574, and 6,031,308, a planetary gear train is attached to an open end of a supporting shaft. Each of above U.S. Pat. Nos. 6,196,347 and 6,031,308 discloses a reduction gear assembly having a Ferguson's mechanical paradox gear. Each of above U.S. Pat. Nos. 6,296,072 and 6,629,574 discloses a reduction gear assembly having a two-stage speed reduction arrangement.

However, the gear motors of the patents having a reduction gear assembly are bulky. Specifically, length of the supporting shaft is excessive. Hence, the prior art gear motors are not appropriate for installation in a limited space.

U.S. Pat. No. 7,886,858 to Chen discloses a pancake gear motor in combination with a planetary gear train for solving the problem of bulkiness and shortening the axial length of the supporting shaft. For example, a rotor (or a rotor shaft of a carrier of a planetary gear train) is attached to a supporting shaft which is in turn attached to a hub spindle. They are supported by a hub bearing sub-assembly. However, strong vibration can occur when the axially attached arrangement rotates in high speed. Further, there is no teaching of the difference of the number of teeth between stationary ring gear and driving ring gear and the optimum number of the gears of the planetary gear train. Furthermore, it is silent about the optimum number of the gears of the planetary gear train with respect to speed reduction. Moreover, precision of the driving ring gear and the stationary ring gear is low, performance of the gear motor is low, and noise can be generated in operation.

Notwithstanding the prior art, the invention is neither taught nor rendered obvious thereby.

BRIEF SUMMARY

It is desirable to provide a pancake gear motor which addresses the above described problems including silent about the optimum number of the gears of the planetary gear train with respect to speed reduction, low precision of the driving ring gear and the stationary ring gear, low performance of the gear motor, and noise generated in operation.

It is therefore an object of the invention to provide a gear motor comprising a housing; a supporting shaft disposed along an axis of the housing and fastened in the housing; a planetary gear train as a speed reducer which is rotatably supported by the supporting shaft; and an electric motor including an outer stator and an inner permanent magnet, the electric motor disposed around the planetary gear train and within the housing; wherein the planetary gear train comprises a stationary sun gear secured to the housing and coaxially disposed around the axis of the housing; a driving sun gear as a torque output; a plurality of planet gear assemblies equally spaced around an outer surface of the stationary sun gear and an outer surface of the driving sun gear wherein each planet gear assembly includes a first gear and a second gear coaxial with and co-rotated with the first gear, the first gear meshes the stationary sun gear, and the second gear meshes the driving sun gear; and a carrier pivotably supported by the supporting shaft and attached to the permanent magnet to form a part of a rotation mechanism of the electric motor wherein the rotation mechanism is a part of an annular rotor between the stationary sun gear and the driving sun gear, the annular rotor further separating the stationary sun gear from the driving sun gear, and wherein the carrier is configured to accommodate the planet gear assemblies to serve as a torque input of the planetary gear train.

Preferably, the number of teeth of the first gear is equal to that of teeth of the second gear, there is a difference between the number of teeth of the stationary sun gear and the number of teeth of the driving sun gear, and the difference is a multiple of the number of the planet gear assemblies.

Preferably, the difference is equal to the number of the planet gear assemblies.

Preferably, the modulus of the first gear is different from the modulus of the second gear, the modulus of the stationary sun gear is equal to that of the first gear, and the modulus of the driving sun gear is equal to that of the second gear.

Preferably, further comprises a first carrying ring and a second carrying ring disposed at two ends of the planet gear assemblies respectively, the first and second carrying rings configured to rotate the first and second gears of each planet gear assembly about the supporting shaft.

Preferably, further comprises a plurality of axles each driven through the first and second gears of each planet gear assembly, one ends of the axles are equally spaced on the first carrying ring, and the other ends of the axles are equally spaced on the second carrying ring.

Preferably, further comprises a driving sun gear assembly including the driving sun gear, a disc as a torque output, and a sleeve put on the supporting shaft.

Preferably, further comprises a driving sun gear assembly including the driving sun gear and a disc, and a bearing mounted between an outer surface of the driving sun gear assembly and the housing to employ the disc as a torque output.

Preferably, further comprises a driving sun gear assembly including the driving sun gear, a disc as a torque output, and a sleeve put on the supporting shaft, and a bearing mounted between an outer surface of the driving sun gear assembly and the housing to employ the disc as a torque output.

Preferably, the permanent magnet is attached to the carrier, and the carrier includes an annular rib in an inner edge, the annular rib extending toward the supporting shaft to separate the stationary sun gear from the driving sun gear.

Preferably, the electric motor is a brushless direct current motor, the permanent magnets has a plurality of pairs of a north magnetic pole and an opposite south magnetic pole, the magnetic poles are arranged as a ring, the permanent magnet is attached to the carrier, and the stator has a plurality of windings wound on a plurality of stacked steel plates made of magnetic material.

The invention has the following advantages: The conventional ring gear is eliminated by the planetary gear train of the gear motor in which the ring gear difficult of being increased in precision is replaced by a sun gear which is easy to be manufactured in high precision. Performance is increased greatly. Noise is decreased greatly. The stationary sun gear and the driving sun gear are provided at both ends of the motor and this is a great improvement in comparison with the conventional gear motor which only allows the gear motor to extend toward one end of the motor. Space of the gear motor is greatly decreased and a pancake gear motor is implemented.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring to FIGS. 1 to 6, a gear motor in accordance with a preferred embodiment of the invention comprises a housing 10, an electric motor (e.g., brushless direct current motor) 20, and a planetary gear train 30 as a speed reducer as discussed in detail below.

Figure 1:
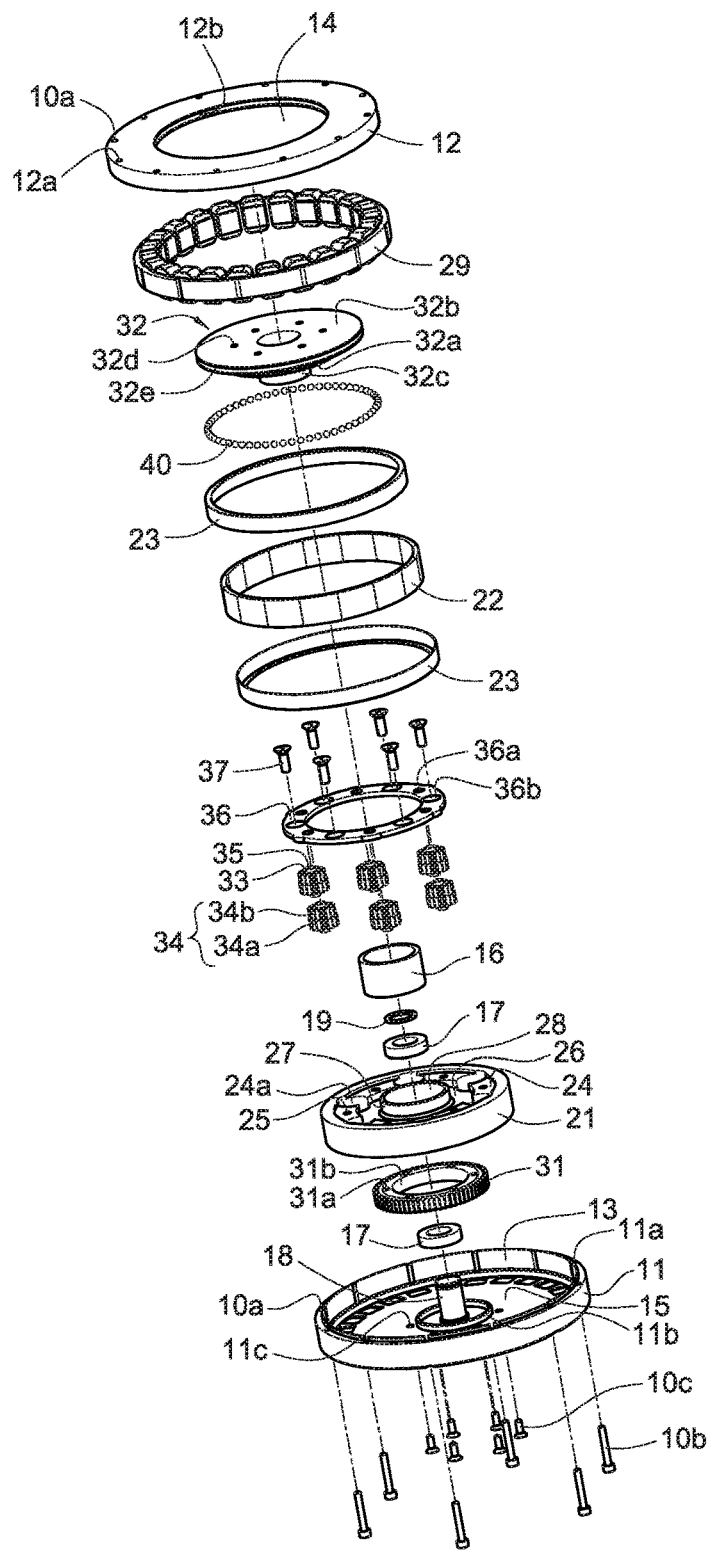
FIG. 1 is an exploded view of a gear motor according to a preferred embodiment of the invention.
Figure 2:
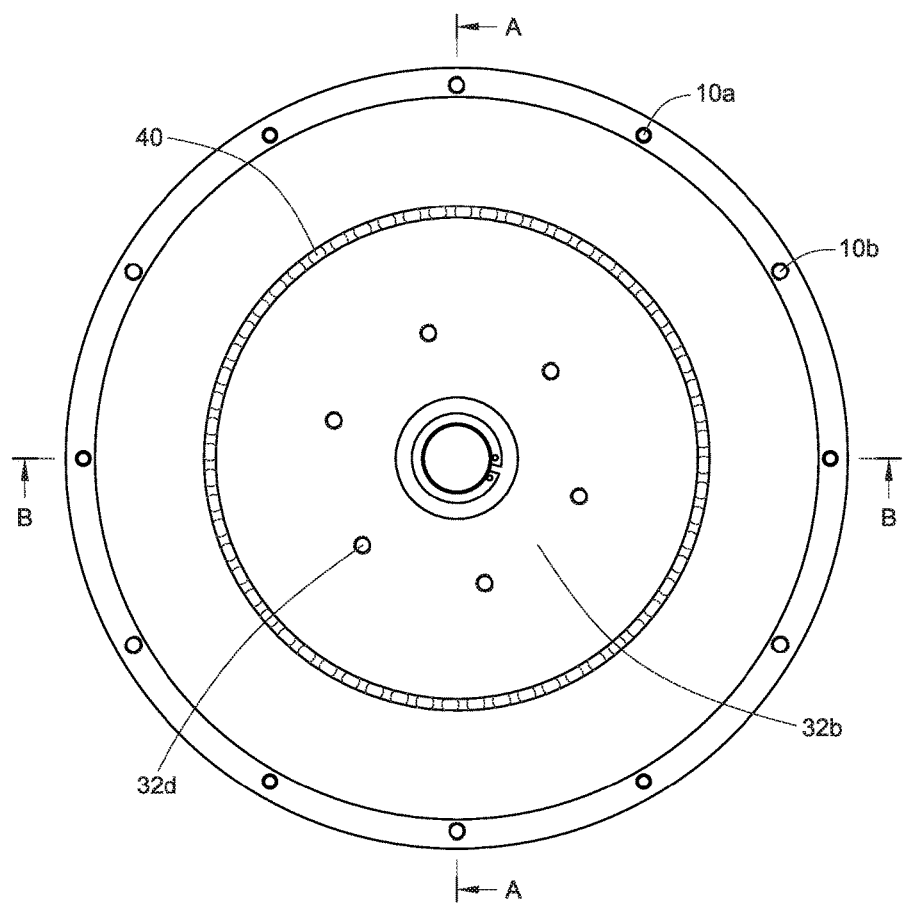
FIG. 2 is an end view of the assembled gear motor.
Figure 3:
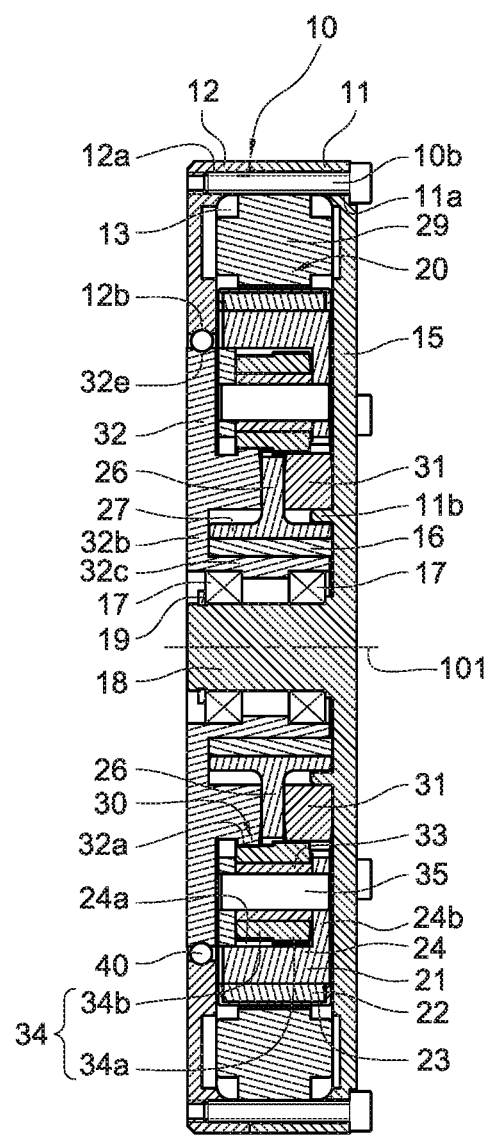
FIG. 3 is a sectional view taken along line A-A of FIG. 2.

The housing 10 is configured to house both the motor 20 and the planetary gear train 30. A central supporting shaft 18 is provided along an axis 101 of the housing 10 and fastened in the housing 10. The motor 20 is provided around the planetary gear train 30 and disposed in the housing 10. As shown in FIGS. 1 and 3, the housing 10 includes a first shell 11 having a plurality of holes 11a, and a second shell 12 having a plurality of threaded holes 12a in which a plurality of screws 10b are driven through the holes 11a into the threaded holes 12a to fasten the second shell 12 and the first shell 11 together to form the housing 10. The first shell 11 has a blind member 15 at one end of the housing 10. The second shell 12 has an opening 14 at the other end of the housing 10. A space 13 is provided in the housing 10.

A plurality of holes 10a are formed through both the first shell 11 and the second shell 12. A plurality of screws are driven through the holes 10a to secure the gear motor to a device so that torque can be imparted from the gear motor to the device in operation. As shown in FIGS. 1 and 3, the supporting shaft 18 is provided along the axis 101 of the housing 10 and extends from the blind member 15 to the opening 14 so that both the planetary gear train 30 and the annular rotor 21 can be rotated on the supporting shaft 18.

As shown in FIGS. 1 and 3, the planetary gear train 30 includes a stationary sun gear 31, a driving sun gear 32a, a plurality of planet gear assemblies 34 and a carrier 24. The stationary sun gear 31 is disposed around the axis 101 and fastened in the housing 10. The driving sun gear 32a is an output of the planetary gear train 30. The planet gear assemblies 34 are equally spaced on outer edges of the stationary sun gear 31 and the driving sun gear 32a respectively. The planet gear assembly 34 includes a first gear 34a and a second gear 34b coaxially disposed with the first gear 34a. The first gear 34a meshes the stationary sun gear 31. The second gear 34b meshes the driving sun gear 32a. The carrier 24 is directly or indirectly pivotably supported by the supporting shaft 18 so that the carrier 24 can be taken as an input of the planetary gear train 30. The carrier 24 is a part of the annular rotor 21 which includes a permanent magnet 22 of the motor 20. In fact, the annular rotor 21 is a rotation member of the motor 20 and rotatably supported by the supporting shaft 18 as discussed later. An annular rib 26 is provided in the annular rotor 21 and interconnected the stationary sun gear 31 and the driving sun gear 32a for separating the stationary sun gear 31 and the driving sun gear 32a. The carrier 24 comprises a plurality of cavities 24a for accommodating the planet gear assemblies 34.

As shown in FIG. 1, the stationary sun gear 31 comprises a plurality of threaded holes 31a and an axial channel 31b. A plurality of holes 11c are provided on the blind member 15 at one end of the housing 10 and aligned with the threaded holes 31a. An annular flange 11b is formed on the blind member 15, disposed in the channel 31b, and coaxial with the axis 101. The flange 11b is used to fasten the stationary sun gear 31 around the axis 101. A plurality of screws 10c are driven through the holes 11c into the threaded holes 31a to fasten the stationary sun gear 31 and the first shell 11 together.

Figure 5:
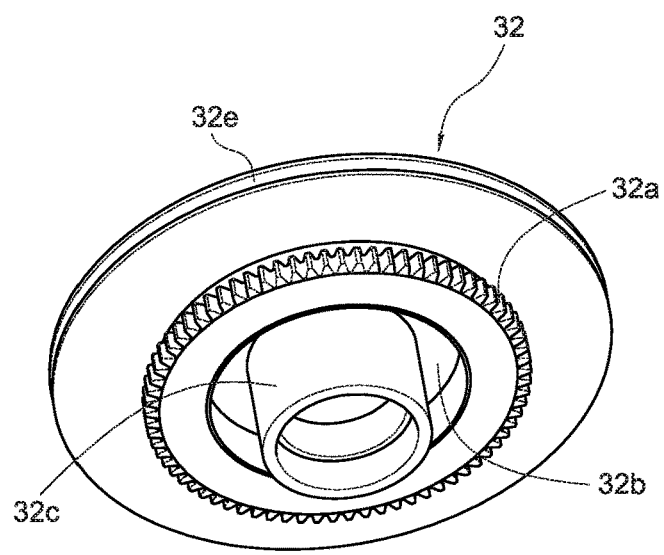
FIG. 5 is another perspective view of the driving sun gear assembly of FIG. 1.

As shown in FIGS. 1 and 5, the driving sun gear assembly 32 includes the driving sun gear 32a, a disc 32b, and a sleeve 32c put on the supporting shaft 18. A bearing 17 is mounted between the sleeve 32c and the supporting shaft 18. The disc 32b is used to impart torque. A plurality of threaded holes 32d are formed through the disc 32b so that screws can be used to drive into the threaded holes 32d through a member for fastening the driving sun gear assembly 32 and the member together. As discussed above, a bearing 16 is mounted between the sleeve 32c and the carrier 24 so that the carrier 24 can be rotatably supported on and by the supporting shaft 18. The disc 32b may extend through the opening 14 to dispose at the other end of the housing 10. Thus, the disc 32b can be served as an output.

As shown in FIGS. 3 and 5, the driving sun gear assembly 32 includes the driving sun gear 32a and the disc 32b (i.e., without the sleeve 32c). A bearing can be mounted between an outer surface of the driving sun gear assembly 32 and the housing 10 so as to employ the disc 32b as an output. In detail, an annular first grooved rail 12b is provided on an edge of the opening 14 of the second shell 12. An annular second grooved rail 32e is provided on an outer edge of the disc 32b of the driving sun gear assembly 32. A plurality of steel balls 40 are rotatably disposed between the first grooved rail 12b and the second grooved rail 32e to function as a bearing so that the driving sun gear assembly 32 can stably rotate. In practice, the driving sun gear assembly 32 is rotatably supported by the supporting shaft 18 and configured to rotate in the housing 10. Thus, a stable rotation of the driving sun gear assembly 32 is carried out.

The number of the planet gear assemblies 34 is six in the embodiment and the planet gear assemblies 34 are equally spaced around an outer surface of the stationary sun gear 31 and an outer surface of the driving sun gear 32a. In the spaced arrangement, a first carrying ring 24b and a second carrying ring 36 are disposed at two ends of the planet gear assemblies 34 respectively. Thus, the planet gear assemblies 34 are positioned to be disposed around the outer surface of the stationary sun gear 31 and the outer surface of the driving sun gear 32a.

The first carrying ring 24b can be a separate component in other embodiments. Alternatively, in the embodiment, the first carrying ring 24b is formed integrally with the cavities 24a of the carrier 24. Each planet gear assembly 34 includes the first gear 34a and the second gear 34b coaxially disposed with the first gear 34a. Each of a plurality of axles 35 is provided through a center of the planet gear assembly 34. A bearing 33 is provided between the axle 35 and the planet gear assembly 34. Six (i.e., equal to the number of the planet gear assembly 34) holes 36a are provided through the second carrying ring 36 and six holes 24c are provided through the first carrying ring 24b. Thus, each axle 35 can be driven through the holes 36a and 24c to assemble the first carrying ring 24b, the planet gear assembly 34 and the second carrying ring 36.

Figure 4:
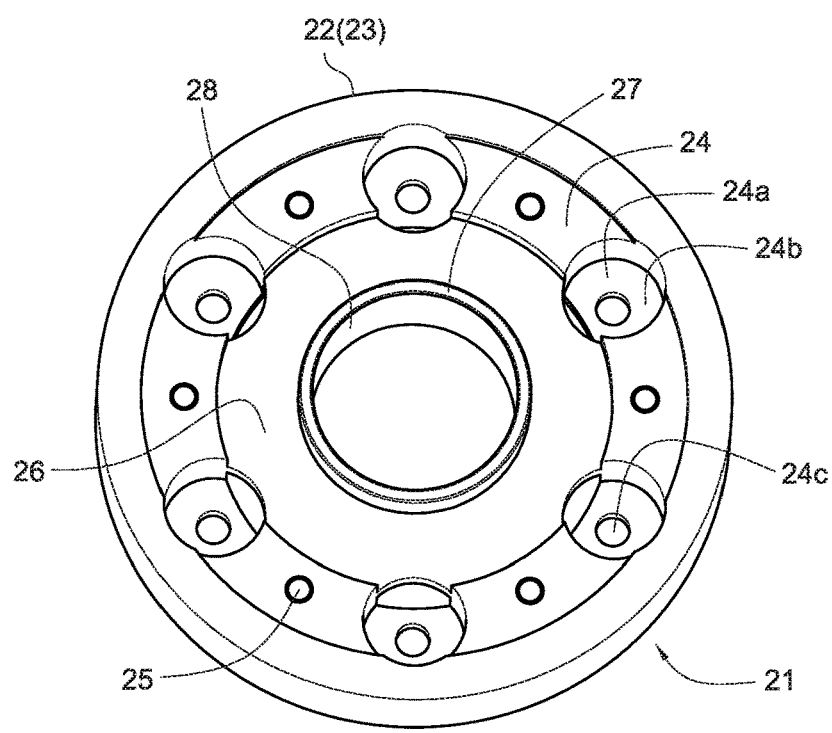
FIG. 4 is another perspective view of the annular rotor of FIG. 1.
Figure 6:
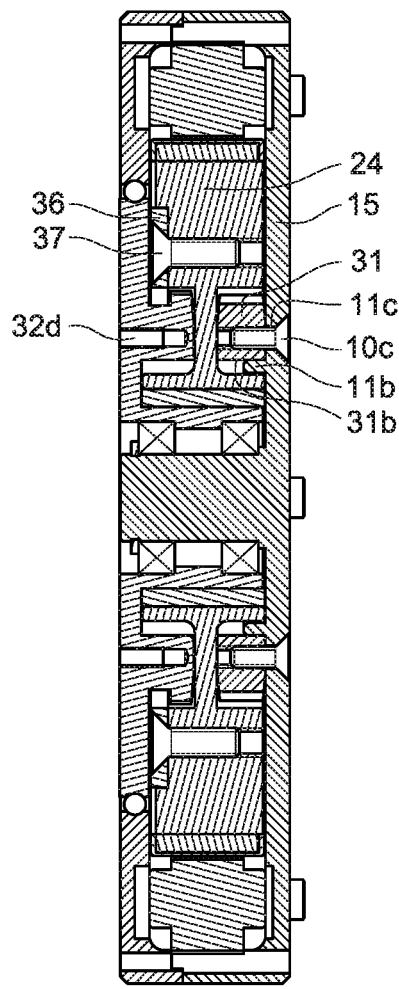
FIG. 6 is a sectional view taken along line B-B of FIG. 2.

As shown in FIGS. 3, 4 and 6, a plurality of (six) equally spaced holes 36b are provided through the second carrying ring 36. A plurality of (six) threaded holes 25 are provided through the carrier 24. Thus, screws 37 can be used to drive through the holes 36a into the threaded holes 25 to fasten the second carrying ring 36 and the carrier 24 together. Also, the planet gear assemblies 34 of the planetary gear train 30 are rotatably constrained in position by and between the first carrying ring 24b and the second carrying ring 36. As described above, the sleeve 32c is put on the supporting shaft 18 and the bearing 17 is rotatably disposed between the sleeve 32c and the supporting shaft 18. The bearing 16 is rotatably disposed between the sleeve 32c and both annular rotor 21 and the carrier 24. Thus, both the annular rotor 21 and the carrier 24 are configured to rotate about the supporting shaft 18. The planet gear assemblies 34 are provided in the carrier 24. In such a manner, the planet gear assemblies 34 are rotatably constrained in position by and between the first carrying ring 24b and the second carrying ring 36 and the planet gear assemblies 34 are configured to rotate about the supporting shaft 18.

As shown in FIG. 3, the first gear 34a meshes the stationary sun gear 31. The second gear 34b meshes the driving sun gear 32a. When the annular rotor 21 rotates, the first gear 34a, driven by the stationary sun gear 31, rotates on the axle 35. Also, both the annular rotor 21 and the first gear 34a rotate about the supporting shaft 18. The second gear 34b, driven by the first gear 34a, causes the driving sun gear 32a to rotate about the supporting shaft 18. As a result, a predetermined ratio of speed reduction of the gear motor of the invention is carried out.

The motor 20 is a pancake type hollow motor and a power source of the gear motor of the invention. The motor 20 includes a ring shaped stator 29 and an inner permanent magnet 22. As discussed above, the permanent magnet 22 is attached to the carrier 24 and together they form a part of a rotation mechanism of the motor 20. The annular rib 26 is provided in an inner edge of the carrier 24 and extends toward the supporting shaft 18. An annular projection 27 is formed on an inner edge of the rib 26. A tunnel 28 is defined by the projection 27. The bearing 16 is rotatably provided between the sleeve 32c of the driving sun gear assembly 32 and the projection 27. Thus, the carrier 24 is indirectly supported by the supporting shaft 18.

The permanent magnet 22 has a plurality of pairs of a north (N) magnetic pole and an opposite south (S) magnetic pole and the magnetic poles are arranged as a ring. The permanent magnet 22 is attached to a surface of the carrier 24. A protection ring 23 made of non-magnetic material is put on the permanent magnet 22 so that the permanent magnet 22 may not dislodge in the rotational operation of the gear motor. The annular rotor 21 is comprised of the protection ring 23, the permanent magnet 22, the carrier 24, the rib 26 and the projection 27.

The stator 29 has a plurality of windings wound on a plurality of stacked steel plates made of magnetic material. According to Ampere's law, current, supplied from a power supply and controlled by a controller, passes through a wire (e.g., windings of the stator 29) produces a magnetic field. Further, the magnetic field interacts with the magnetic field of the permanent magnet 22 to rotate the annular rotor 21, i.e., the motor 20 being rotated.

The number of the teeth of the stationary sun gear 31 is different from that of the teeth of the driving sun gear 32a in the embodiment. In detail, the number of the teeth of the stationary sun gear 31 is an integer A, the number of the teeth of the driving sun gear 32a is an integer B, and A is not equal to B. Further, the modulus of the first gear 34a is different from the modulus of the second gear 34b in which the first gear 34a rotates on the axle 35, the second gear 34b rotates on the axle 35 as well, and both the first gear 34a and the second gear 34b rotate about the supporting shaft 18. In detail, the modulus of the first gear 34a is X, the modulus of the second gear 34b is Y, and X is not equal to Y. But the number of the teeth of the first gear 34a is equal to that of the teeth of the second gear 34b. The stationary sun gear 31 meshes the first gear 34a. Thus, the stationary sun gear 31 has the modulus X. Likewise, the driving sun gear 32a meshes the second gear 34b. Thus, the driving sun gear 32a has the modulus Y.

According to Ampere's law, current through a wire (e.g., windings of the stator 29) produces a magnetic field. Further, the magnetic field interacts with the magnetic field of the permanent magnet 22 to rotate the annular rotor 21. Further, the carrier 24 rotates to cause the planet gear assemblies 34 to rotate about the supporting shaft 18. The first gear 34a, meshing the stationary sun gear 31, rotates. The first and second gears 34a, 34b are arranged coaxially and co-rotated. In response to rotating the first gear 34a, the second gear 34b also rotates in which the first gear 34a rotates on the axle 35, the second gear 34b rotates on the axle 35 as well, and both the first gear 34a and the second gear 34b rotate about the supporting shaft 18.

For decreasing speed of the driving sun gear assembly 32 relative to the annular rotor 21, or the permanent magnet 22, the first gears 34a having the modulus X mesh the stationary sun gear 31 having the number of the teeth A, and the second gears 34b having the modulus Y mesh the driving sun gear 32a having the number of the teeth B. The stationary sun gear 31 is prevented from being rotated because it is affixed to the housing 10. The driving sun gear 32a, having the number of teeth B which is different from the number of the teeth A of the stationary sun gear 31, may rotate the driving sun gear 32a about the annular rotor 21 in a low speed. As a result, the disc 32b of the driving sun gear assembly 32 rotates at a reduced speed at its output (i.e., load) and the rotational speed of the load also decreases. Speed reduction ratio of the gear motor of the embodiment of invention can be expressed below.

$$GR=B/(B-A)$$

i.e., the speed reduction ratio GR is defined by the number of the teeth B of the driving sun gear 32a divided by a difference between the number of the teeth B of the driving sun gear 32a and the number of the teeth A of the stationary sun gear 31. It is noted that the number, obtained by taking the number of the teeth A of the stationary sun gear 31 away from the number of the teeth B of the driving sun gear 32a, is a multiple of the number of the planet gear assemblies 34. A maximum speed reduction ratio is obtained when the multiple is one.

The characteristics of the invention are briefed below. The gear motor incorporating a conventional epicyclic gearing including a carrier, a sun gear, a plurality of planet gears supported by the carrier, and a ring gear is eliminated by the planetary gear train 30 of the gear motor of the invention in which the ring gear difficult of being increased in precision is replaced by a sun gear of the invention which is easy to be manufactured in high precision. Performance is increased greatly. Noise is decreased greatly. The stationary sun gear 31 and the driving sun gear 32a are provided at both ends of the motor 20 and this is a great improvement in comparison with the conventional gear motor which only allows the gear motor to extend toward one end of the motor. Thus, space of the gear motor is greatly decreased and a pancake gear motor is implemented.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A gear motor comprising:
    a housing;
    a supporting shaft disposed along an axis of the housing and fastened in the housing;
    a planetary gear train as a speed reducer which is rotatably supported by the supporting shaft; and
    an electric motor including an outer stator and an inner permanent magnet, the electric motor disposed around the planetary gear train and within the housing;
    wherein the planetary gear train comprises:
    a stationary sun gear secured to the housing and coaxially disposed around the axis of the housing;
    a driving sun gear as a torque output;
    a plurality of planet gear assemblies equally spaced around an outer surface of the stationary sun gear and an outer surface of the driving sun gear wherein each planet gear assembly includes a first gear and a second gear coaxial with and co-rotated with the first gear, the first gear meshes the stationary sun gear, and the second gear meshes the driving sun gear; and
    a carrier pivotably supported by the supporting shaft and attached to the permanent magnet to form a part of a rotation mechanism of the electric motor wherein the rotation mechanism is a part of an annular rotor between the stationary sun gear and the driving sun gear, the annular rotor further separating the stationary sun gear from the driving sun gear, and wherein the carrier is configured to accommodate the planet gear assemblies to serve as a torque input of the planetary gear train.

2. The gear motor of claim 1, wherein the number of teeth of the first gear is equal to that of teeth of the second gear, there is a difference between the number of teeth of the stationary sun gear and the number of teeth of the driving sun gear, and the difference is a multiple of the number of the planet gear assemblies.

3. The gear motor of claim 2, wherein the difference is equal to the number of the planet gear assemblies.

4. The gear motor of claim 2, wherein the modulus of the first gear is different from the modulus of the second gear, the modulus of the stationary sun gear is equal to that of the first gear, and the modulus of the driving sun gear is equal to that of the second gear.

5. The gear motor of claim 1, wherein the modulus of the first gear is different from the modulus of the second gear, the modulus of the stationary sun gear is equal to that of the first gear, and the modulus of the driving sun gear is equal to that of the second gear.

6. The gear motor of claim 1, further comprising a first carrying ring and a second carrying ring disposed at two ends of the planet gear assemblies respectively, the first and second carrying rings configured to rotate the first and second gears of each planet gear assembly about the supporting shaft.

7. The gear motor of claim 6, further comprising a plurality of axles each driven through the first and second gears of each planet gear assembly, wherein one ends of the axles are equally spaced on the first carrying ring, and wherein the other ends of the axles are equally spaced on the second carrying ring.

8. The gear motor of claim 1, further comprising a driving sun gear assembly including the driving sun gear, a disc as a torque output, and a sleeve put on the supporting shaft.

9. The gear motor of claim 1, further comprising a driving sun gear assembly including the driving sun gear and a disc, and a bearing mounted between an outer surface of the driving sun gear assembly and the housing to employ the disc as a torque output.

10. The gear motor of claim 1, further comprising a driving sun gear assembly including the driving sun gear, a disc as a torque output, and a sleeve put on the supporting shaft, and a bearing mounted between an outer surface of the driving sun gear assembly and the housing to employ the disc as a torque output.

11. The gear motor of claim 1, wherein the permanent magnet is attached to the carrier, and the carrier includes an annular rib in an inner edge, the annular rib extending toward the supporting shaft to separate the stationary sun gear from the driving sun gear.

12. The gear motor of claim 11, wherein the electric motor is a brushless direct current motor, the permanent magnets has a plurality of pairs of a north magnetic pole and an opposite south magnetic pole, the magnetic poles are arranged as a ring, the permanent magnet is attached to the carrier, and the stator has a plurality of windings wound on a plurality of stacked steel plates made of magnetic material.

* * * * *